(12) United States Patent
Sørensen et al.

(10) Patent No.: US 7,644,746 B2
(45) Date of Patent: Jan. 12, 2010

(54) ROTARY ULTRASONIC SEALER

(75) Inventors: Poul Sørensen, Hårlev (DK); Brian Voss, Kolding (DK)

(73) Assignee: 3L-Ludvigsen A/S, Tommerup (DK)

( * ) Notice: Subject to any disclaimer, the term of this patent is extended or adjusted under 35 U.S.C. 154(b) by 304 days.

(21) Appl. No.: 11/886,590

(22) PCT Filed: Mar. 23, 2006

(86) PCT No.: PCT/DK2006/000163

§ 371 (c)(1),
(2), (4) Date: Sep. 18, 2007

(87) PCT Pub. No.: WO01/53032

PCT Pub. Date: Jul. 26, 2001

(65) Prior Publication Data

US 2009/0032198 A1 Feb. 5, 2009

(30) Foreign Application Priority Data

Mar. 23, 2005 (DK) ............................. 2005 00418

(51) Int. Cl.
*B32B 37/00* (2006.01)
(52) U.S. Cl. .................. 156/580.2; 156/73.1; 156/555; 156/582
(58) Field of Classification Search ................ 156/73.1, 156/228, 555, 580.1, 580.2, 582; 264/442, 264/443, 444, 445; 228/1.1, 110.1; 425/174.2; 310/321, 323.01, 323.18, 348, 351
See application file for complete search history.

(56) References Cited

U.S. PATENT DOCUMENTS

| 5,096,532 | A | * | 3/1992 | Neuwirth et al. | ......... 156/580.1 |
|---|---|---|---|---|---|
| 5,305,556 | A | | 4/1994 | Kopp et al. | |
| 5,486,733 | A | | 1/1996 | Yamazaki et al. | |
| 5,595,328 | A | | 1/1997 | Safabakhsh et al. | |
| 5,707,483 | A | * | 1/1998 | Nayar et al. | ............. 156/580.2 |
| 5,976,316 | A | * | 11/1999 | Mlinar et al. | ............ 156/580.2 |
| 6,059,923 | A | * | 5/2000 | Gopalakrishna | ......... 156/580.2 |
| 6,613,171 | B2 | * | 9/2003 | McNichols et al. | ........ 156/73.1 |
| 6,877,975 | B2 | * | 4/2005 | Wuchinich | ............... 425/174.2 |

FOREIGN PATENT DOCUMENTS

| GB | 877966 | 9/1961 |
|---|---|---|
| WO | 01/53032 A1 | 7/2001 |

* cited by examiner

*Primary Examiner*—James Sells
(74) *Attorney, Agent, or Firm*—The Nath Law Group; Jerald L. Meyer; Derek Richmond

(57) ABSTRACT

An ultrasonic sealer comprising a hollow shaft (1) having a longitudinal axis (2) and being rotatably arranged in a housing (3) for driven rotation about its longitudinal axis (2). The rotary sealer further comprises a sealing horn (8) arranged coaxially in the hollow shaft (1) and connected to a converter (6) and preferably also a booster (7). The horn (8) is provided with a peripheral sealing area (13) outside an axial end (13) of the hollow shaft (1). The horn (8) is connected to the hollow shaft (1) by means of at least one annular, metallic support (11) extending between an outer face (14) of the horn (8) and an inner face (10) of the hollow shaft (1). The at least one annular support (11) is corrugated in cross section such that at least two grooves and one ridge arranged there between are provided between the inner face (10) of the hollow shaft (1) and the outer face (14) of the horn (8).

11 Claims, 6 Drawing Sheets

ROTARY ULTRASONIC SEALER

TECHNICAL FIELD

The invention relates to a rotary ultrasonic sealer comprising a hollow shaft having a longitudinal axis and being rotatably arranged in a housing for driven rotation about its longitudinal axis, said sealer further comprising a horn arranged coaxially in the hollow shaft and connected to a converter and preferably also a booster, the horn being provided with a sealing area outside an axial end of the hollow shaft and the housing and wherein the horn is connected to the hollow shaft by means of at least one annular, metallic support extending between an outer face of the horn and an inner face of the hollow shaft and abutting the inner face of the hollow shaft with an radially outer face, said support being arranged in a point with minimum vibration amplitude of the horn in the direction of the longitudinal axis.

BACKGROUND ART

Such a rotary sealer is inter alia known from U.S. Pat. No. 6,786,384 B1.

Typically, in addition to the said one support the horn or the booster connected thereto is provided with a further support arranged a multiple of half a wavelength, e.g. half a wavelength of the applied vibrations, from the said one support and is thus arranged in a point with minimum vibration amplitude in the longitudinal direction. In these points with minimum vibration amplitude in the longitudinal direction, the radial displacement reaches its maximum or is close to reaching its maximum when the horn vibrates.

Furthermore, rotary sealers typically comprise an anvil, e.g. an anvil roller, being rotatable in opposite direction of the horn and having a peripheral face adjacent the sealing face of the sealing horn. The part(s) to be sealed—typically of a thermoplastic material—is/are inserted between the sealing face of the horn and the peripheral face of the anvil roller, sealing being provided due to the vibration of the sealing face of the horns and the pressure exerted between the sealing face and the peripheral face of the anvil roller.

As mentioned, maximum radial movements occur in the points with minimum vibration amplitude. Accordingly, it is vital that the supports are resilient. If the supports are not suitably resilient, a large amount of energy is transferred to the hollow shaft and the housing which otherwise would be utilized in the sealing process. Furthermore, increased mechanical wear arises between the supports, if the supports are not adequately resilient. As a result, the rotary sealer operates unevenly with reduced precision and reduced operating life. Additionally, insufficiently resilient supports cause intense heating of the support areas and may at worst cause the supports to be sealed to the hollow shaft.

For sealing heavy materials or sealing at high velocities, a substantial amount of energy, high amplitude and a comparatively high pressure between the sealing face of the horn and the material to be sealed are required. Known rotary sealers do not allow for sealing under the above operating conditions without large amounts of energy being dissipated in the hollow shaft and the housing resulting in energy loss and a risk of sealing the supports to the hollow shaft.

DESCRIPTION OF THE INVENTION

The object of the invention is thus to provide a rotary sealer of the above type remedying the above drawbacks of prior art.

The rotary sealer according to the invention is characterised in that the least one annular support is corrugated in cross section such that at least two grooves and one ridge arranged therebetween are provided between the inner face of the hollow shaft and the outer face of the horn, the annular support comprising a first leg and a second leg being interconnected at first ends thereof via a top part and being provided with a first bottom part and a second bottom part, respectively, at second ends opposite the first ends. During vibration of the horn, the radial displacement or expansion of the horn is absorbed by the annular support such that substantially no vibrations are transferred to the hollow shaft and the housing, and the loss of energy is minimised or eliminated. By providing the horn with a support a very accurate positioning of the horn is furthermore obtained resulting in optimum rotation thereof with no or a minimum of slack. This is in contrast to the situation where the horn is not supported but held by the booster which in turn is supported in the hollow shaft by a support. The latter solution causes problems in particular when servicing or repairing the rotary sealer at which it is often necessary to remove the horn from the booster. When remounting the horn on the booster it is practically impossible to remount the horn in exactly the same position as before, thereby causing slack in the sealing area.

According to the invention the annular support may be formed integrally with the horn, whereby the first leg, the first bottom part and the outer face of the horn define a groove. By forming the support integrally with the horn any risk of the support being released from or displaced in relation to the horn during the operation of the rotary sealer is avoided, even at high vibration amplitudes. If high vibration amplitudes are not contemplated, it is, however, also possible to secure the support to the horn in another manner, e.g. by shrinking.

Furthermore according to the invention the annular support may have a third leg extending from the second bottom part such that the third leg, the second bottom part and the second leg define a groove. The radially outer face of the third leg thus provides an increased abutment face with the inner face of the hollow shaft.

In a further development of the above embodiment, an elastomeric material, such as rubber, may be arranged in the groove. The elastomeric material effects an additional dampening or absorption of the vibrations transferred to the hollow shaft and thus to the housing.

Moreover according to the invention the first and second leg of the support may be mutually parallel and the bottom parts may be parallel to the top part. As a result, the corrugation of the annular support may include square waves.

In a further development of the above embodiment, the legs may be parallel to the inner face of the hollow shaft and the bottom part and the top part may be perpendicular to the inner face of the hollow shaft and the outer face of the horn.

Furthermore, the first and second legs of the annular support may be mutually convergent in a direction from the bottom parts to the top part such that the shape of the annular support includes triangular waves.

Both when the corrugated shape of the annular support includes square waves and when it includes triangular waves, a sharp corner may be provided between at least one leg and the upper and/or bottom part(s) associated therewith.

Furthermore, the different legs and/or bottom and top parts of the support may be of different thicknesses and the individual legs may have varying thicknesses over their length, e.g. constant decreasing or increasing thickness.

Moreover, the different legs may be of different lengths and be varyingly mutually interspaced.

Furthermore, the annular support may be provided with a circumferential recess preferably provided in or in associated with one of the bottom parts. By providing the annular support with a circumferential recess in practice it has proved possible to expand the frequency area in which the horn vibrates satisfactorily so as to obtain excellent sealing from a range of ±50 Hz to ±200 Hz in relation to the optimum frequency, e.g. 30 kHz.

The at least one annular support is preferably arranged one quarter of a wavelength of the applied sealing from the cylindrical sealing face of the horn. The support is thereby advantageously arranged as close as possible to the sealing face of the horn and provides optimum support to the horn.

The axial end of the hollow shaft may be axially slotted in the area adjacent the annular support and a clamping means may be provided about the slotted area to clamp the inner face of the hollow shaft in retaining engagement with a radially outer abutment face of the annular support. The clamping means may be a union having an inner thread engaging an outer thread with a slotted area, and having a conical face co-acting with a face in the slotted area for bringing the inner face of the hollow shaft into retaining engagement with the abutment face of the annular support when the union is tightened.

Moreover according to the invention the radially outer face of the support may be provided with a plurality of mutually interspaced recesses, whereby abutment faces are formed between the recesses, said abutment faces abutting the inner face of the hollow shaft. By thus reducing the abutment area between the support and the inner face of the hollow shaft, the energy loss is further reduced, i.e. the energy being transferred to the hollow shaft and from there to the housing.

Furthermore, in its free end face the radially outer leg may be provided with a circumferential groove.

Moreover according to the invention the recesses may include axially extending recesses extending in the entire width of the support and preferably being arranged with the same mutual spacing in a circumferential direction. The recesses are preferably arranged with the same mutual interspacing, but may of course also be arranged with varying mutual interspacing. The number of such recesses are preferably at least three and most preferably at least eight. In practice excellent results have been obtained with forty-five recesses and forty-five corresponding abutment faces. The total area of the recesses constitutes preferably 30-90% and most preferably 40-80%, e.g. about 50-70% of the outer face of the support. In practice a reduction in the energy loss of about 20-25% has thus been obtained by using forty-five axially extending and mutually interspaced recesses which jointly constitute about 60% of the total outer face of the support.

Furthermore, according to the invention, in its top part and/or in its first bottom part and/or in its second bottom part the support may be provided with a number of axially through-going holes preferably arranged with the same mutual spacing in circumferential direction.

Finally according to the invention the through-going holes may be arranged substantially radially aligned with the abutment faces. The vibrations are thereby forced to bypass the holes and thus forced into the areas of the recesses not being in contact with the hollow shaft. Accordingly, a reduction in the transfer of energy to the hollow shaft and thus the housing is obtained. It should be noted that one or more holes may be provided for each abutment face.

It should also be noted that the radially outer face of the support may be provided with at least one circumferential groove for reducing the abutment area between the support and the inner face of the hollow shaft and thereby further reducing the transfer of energy to the hollow shaft and thus to the housing.

The rotary ultrasonic sealer may further include a booster coaxially connected to the horn and connected to the housing by means of an additional annular support which may be shaped as the at least one support of the horn. The booster support is preferably formed integrally with the booster and preferably arranged a multiple of half a wavelength, e.g. half a wavelength, from the at least one support of the horn.

The horn and an optional booster are made in known manner from for instance titanium, steel, aluminium or a copper alloy, such as bronze or brass.

BRIEF DESCRIPTION OF THE DRAWINGS

The invention is explained in detail below with reference to the drawings, in which.

BEST MODE(S) FOR CARRYING OUT THE INVENTION

Figure 1:
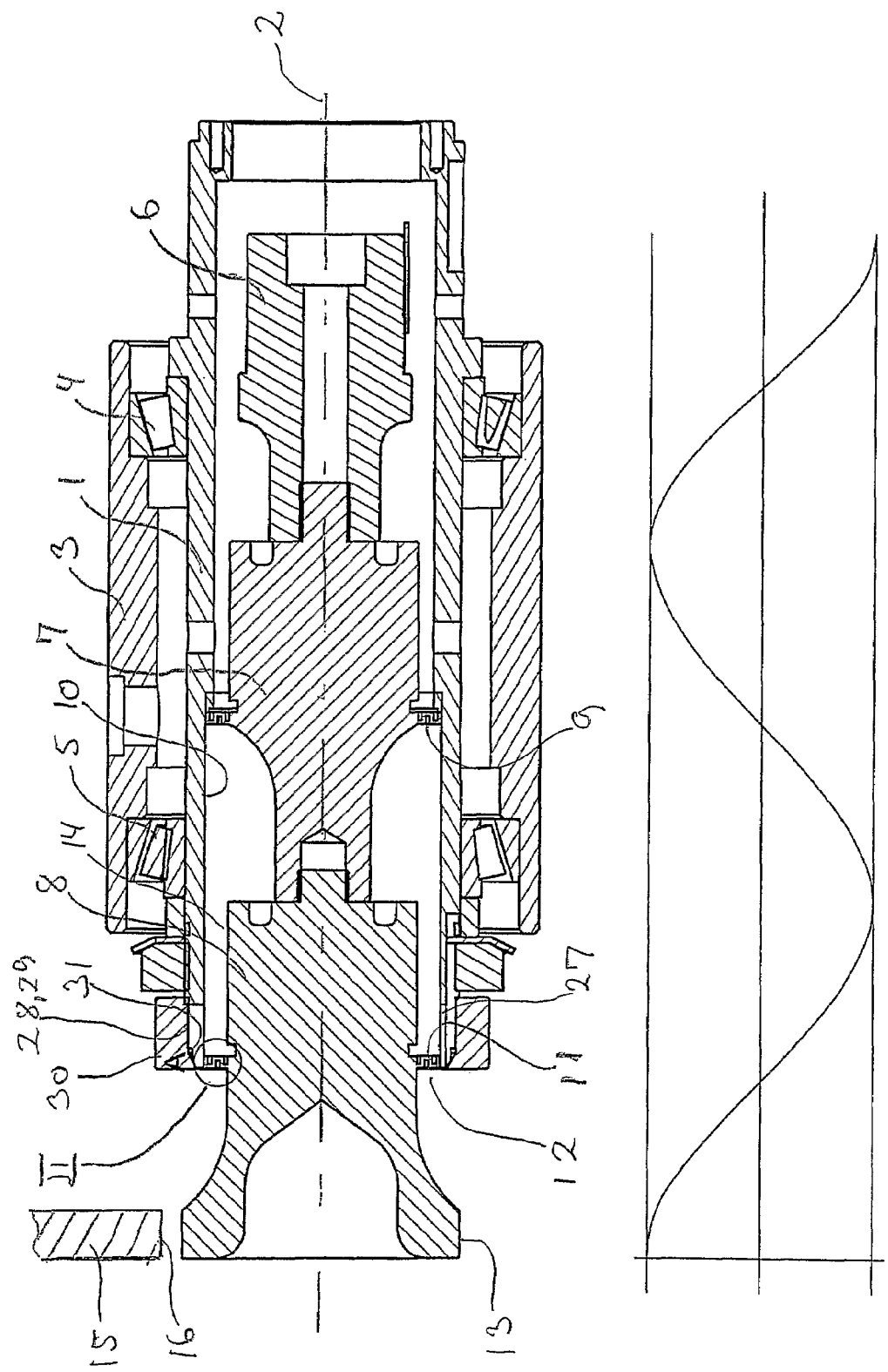
FIG. 1 is a sectional, diagrammatic view of a segment of a rotary sealer according to the invention.

The rotary ultrasonic sealer according to the invention shown in a sectional view in FIG. 1 includes a hollow shaft 1 with a longitudinal axis 2. The hollow shaft 1 is rotatably arranged in a housing 3 by means of two mutually axially interspaced bearings 4, 5. By means of not-shown means the hollow shaft 1 may be made to rotate about its longitudinal axis 2.

An electro-acoustic converter 6 is arranged coaxially inside the hollow shaft 1 and connected to a not-shown generator and generating ultrasonic vibrations in the direction of the longitudinal axis 2. The converter 6 is connected coaxially to a booster 7, which is connected to an ultrasonic sealing horn 8. The booster increases the amplitude of the vibration applied by the converter 6 and transfers this to the horn 8.

The booster is connected with the inner face 10 of the hollow shaft 1 by means of a booster support 9 integrally formed with the booster. In a corresponding manner, the horn 8 is connected with the inner face 10 of the hollow shaft 1 by means of a horn support 11 integrally formed with the horn. The booster support 9 is arranged in a point with minimum vibration amplitude of the booster in the direction of the longitudinal axis 2. Correspondingly, the horn support 11 is arranged in a point with minimum vibration amplitude of the horn in the direction of the longitudinal axis, as shown at the bottom of FIG. 1. The booster support 9 and the horn support 11 are arranged with a mutual interspacing of half a wavelength, as shown at the bottom of FIG. 1. The horn 8 extends out of an axial end 12 of the hollow shaft 1 and at its outer end is provided with a peripheral sealing area 13 having a diameter exceeding that of the outer face 14 of the horn at the horn support 11. The peripheral sealing area 13 is spaced apart by one quarter of a wavelength from the horn support 11, as shown at the bottom of FIG. 1.

As mentioned, the booster support 9 and the horn support 11 are arranged in points with minimum vibration amplitude in the direction of the longitudinal axis and thus in points in which the movement or expansion of the booster 7 and the horn 8, respectively, is at maximum. As the sealing face 13 of the horn 8 is arranged one quarter of a wavelength from the horn support 11, the sealing face is arranged in a point with maximum axial movement and thus minimum radial movement. Furthermore, FIG. 1 illustrates a portion of a anvil roller 15 being rotatable in opposite direction of the horn 8 and having a peripheral face 16 adjacent the sealing face 13 of the sealing horn 8.

Instead of the anvil roller 15 with the peripheral face 16, an additional sealing horn may be used, said horn being connected with a converter and optionally also a booster and having a circumferential sealing area. By means of the thus provided rotary sealer with two horns allowing for sealing from both sides, very heavy materials may be sealed without the material being unduly compressed and displaced from the sealing zone.

Figure 2:
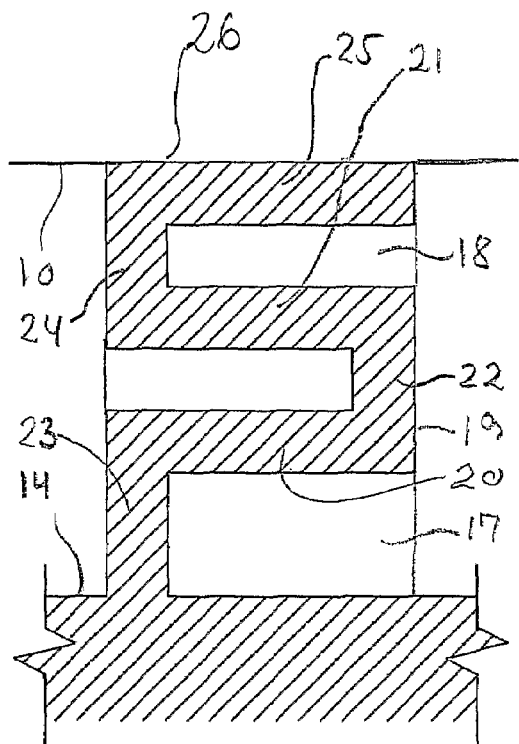
FIG. 2 shows the detail II in FIG. 1, said detail illustrating a first embodiment of an annular support.

Referring now to FIG. 2, a first embodiment of the horn support 11 is described in detail. At the same time, it should be noted that the booster support 9 may be shaped similarly to the horn support 11, why only the horn support 11 and possible examples of modifications and embodiments thereof are described below.

The horn support 11 is annular and thus has a corrugated shape in cross section such that at least two grooves 17, 18 and one ridge 19 are provided between the inner face 10 of the hollow shaft 1. Specifically, the annular support 11 comprises a first leg 20 and a second leg 21 being mutually parallel and extending parallel to the outer face 14 of the horn 8 and the inner face 10 of the hollow shaft 1. At a first end of each leg 20, 21, the legs are interconnected via a top part being perpendicular to the legs, the outer face 14 of the horn 8 and the inner face 10 of the hollow shaft 1. At a second end of the first leg 20 opposite the first end, the support 11 has a first bottom part 23 extending parallel to the top part 22 at an axial distance therefrom and formed integrally with the outer face 14 of the horn 8. Thereby, the first leg 20, the first bottom part 23 and the outer face of the horn define the groove 17. At a second end of the second leg 21 opposite the first end, the support 11 has a second bottom part 24 extending radially aligned with the first bottom part 23. In its radially outer area the second bottom part 24 passes into a third leg 25 extending parallel to the first leg 20 and the second leg 21. The third leg 25 has an radially outer face 26 in retaining engagement with the inner face 10 of the hollow shaft 1. For providing the axial retention of the horn support 11 the hollow shaft 1 has a slotted area 27 at its axial end 12, said area being provided with an outer thread 28, confer FIG. 1. A union 30 provided with a corresponding inner thread 29 has been screwed into the slotted area. The union 30 is provided with a conical face 31 co-acting with a corresponding face on the slotted area 27 for bringing the inner face of the hollow shaft into retaining engagement with the abutment face 26 of the annular support 11 when the union is tightened.

Figure 3:
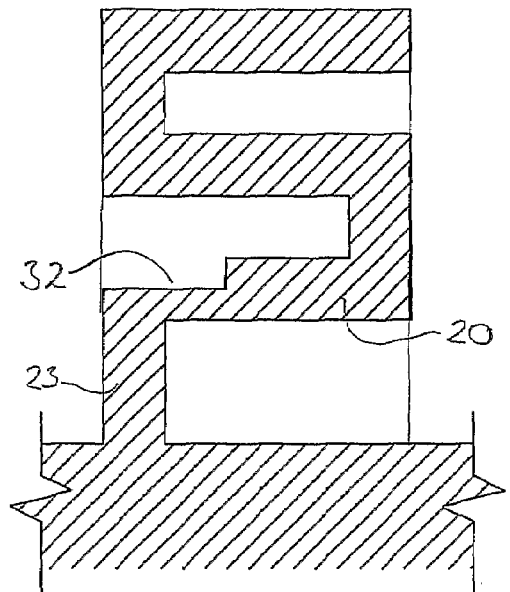
FIG. 3 is a sectional view of a first modification of the support shown in FIG. 2.

FIG. 3 shows a modification of the support shown in FIG. 2, a recess 32 being formed in a transitional area between the first bottom part 23 and the first leg 20. The recess serves to expand the frequency range in which satisfactory sealing can be obtained.

Figure 4:
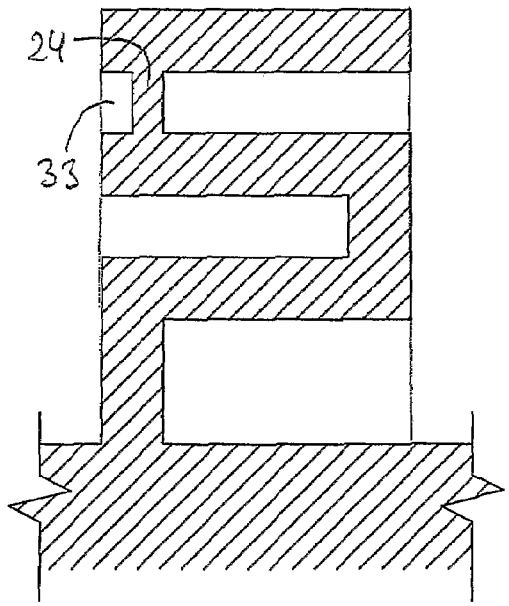
FIG. 4 shows a second modification of the support shown in FIG. 2.

With the same purpose, a recess 33 is provided in the second bottom part 24 in the modification shown in FIG. 4.

In the embodiments of the support 11 shown in FIGS. 1-4, all corners between the legs and the bottom parts are sharp-edged, shaped specifically as rectangular, sharp corners.

Figure 5:
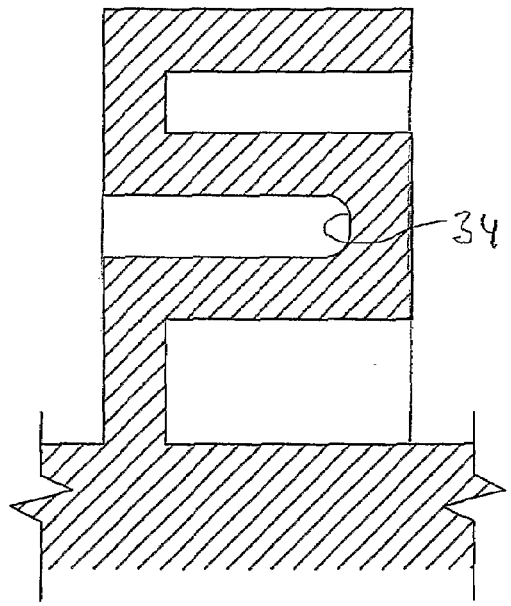
FIG. 5 shows a third modification of the support shown in FIG. 2.

FIG. 5 shows a modification with a soft inner corner rounding 34.

Figure 6:
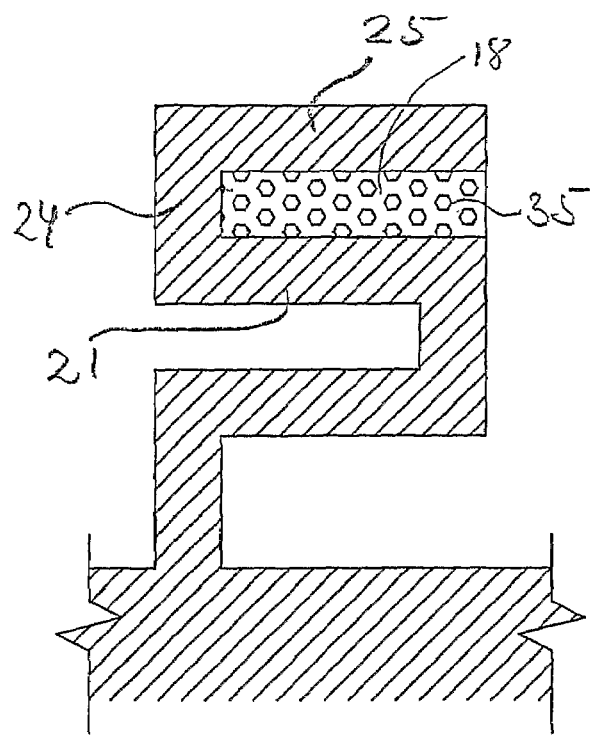
FIG. 6 shows a fourth modification of the support shown in FIG. 2.

In the modification shown in FIG. 6 which corresponds substantially to the embodiment in FIG. 2, an annular body 35 of an elastomeric material is provided in the groove 18 defined by the third leg 25, the second leg 21 and the second bottom part 24.

Figures 7, 8:
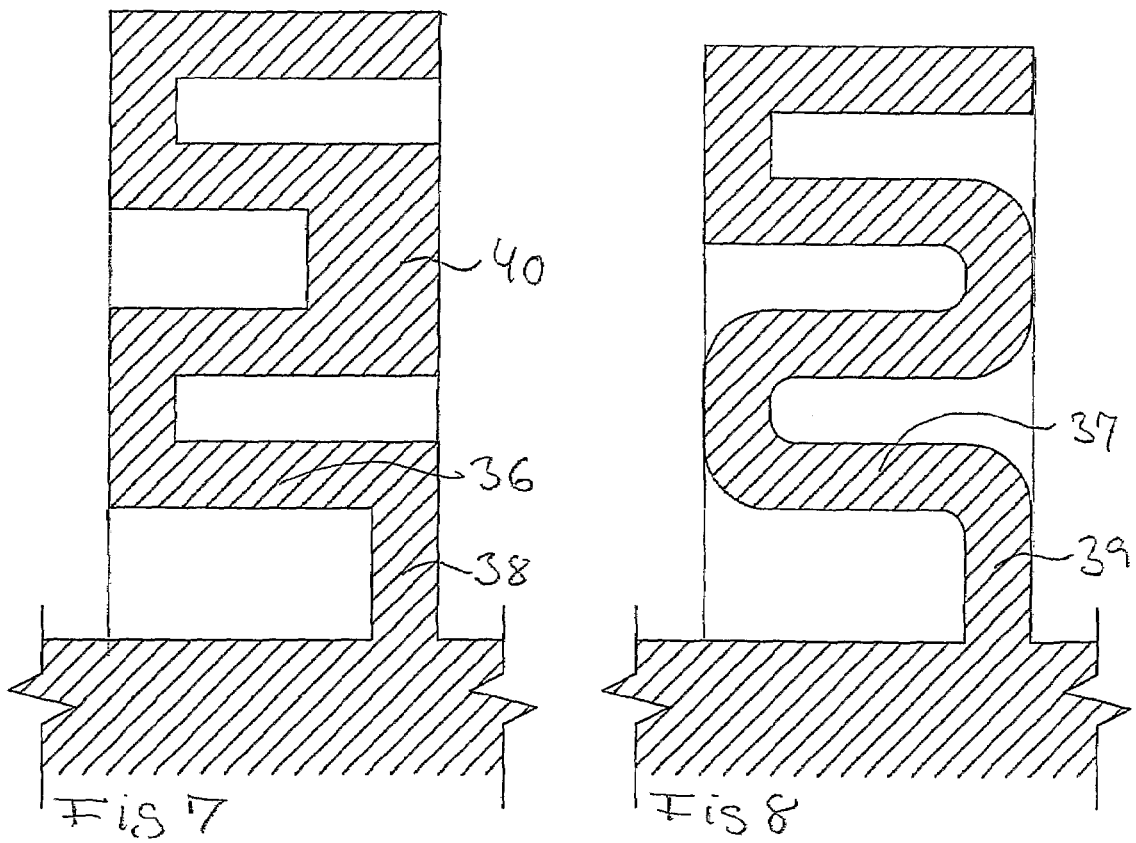
FIG. 7 shows a fifth modification of the support shown in FIG. 2.
FIG. 8 shows a sixth modification of the support shown in FIG. 2.

FIGS. 7 and 8 show modifications of a horn support having an additional leg 36, 37, respectively, and an additional top part 38, 39, respectively. Moreover, the embodiment in FIG. 7 has increased wall thickness, ie. mass, in the area 40 for providing additional dampening. FIG. 8 illustrates the use of both sharp-edged transitions and rounded transitions between legs and bottom and top parts.

Figure 9:
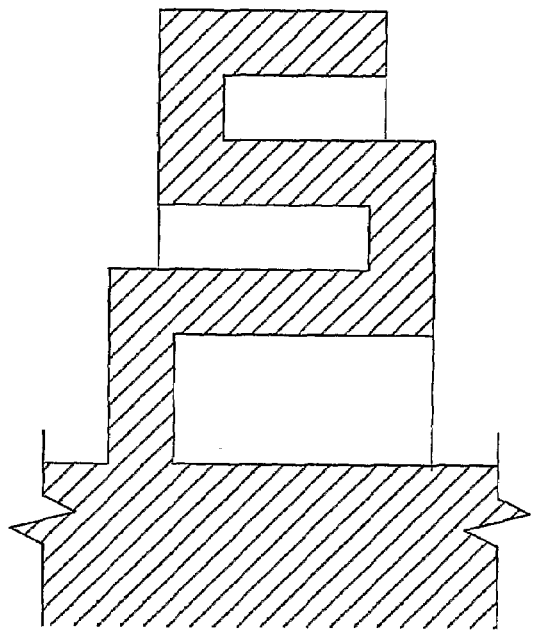
FIG. 9 shows a seventh modification of the support shown in FIG. 2.

FIG. 9 shows a modification in which the mutually parallel legs are of different lengths, the leg length decreasing radially outwardly. The leg length may, however, increase radially outwardly.

Figure 10:
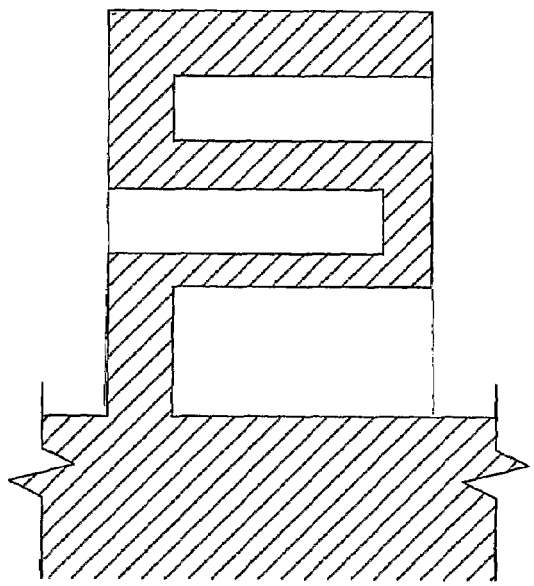
FIG. 10 shows an eighth modification of the support shown in FIG. 2.

FIG. 10 shows a modification in which the different legs have different thicknesses, whereby the radially inner leg has the smallest thickness and the radially outer leg has the largest thickness. The reverse situation, in which the legs have decreasing thicknesses radially outwardly, is, however, also possible.

Figure 11:
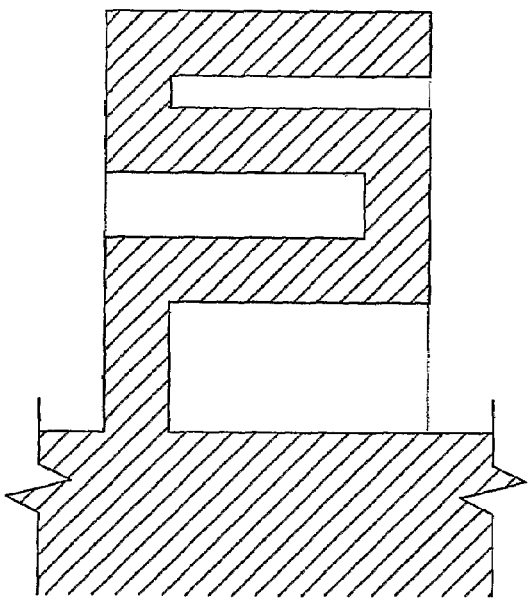
FIG. 11 shows a ninth modification of the support shown in FIG. 2.

FIG. 11 shows a modification in which the interspacing between the legs varies, whereby the interspacing between the different legs decreases seen radially outwardly. The leg spacing may also increase radially outwardly.

Figure 12:
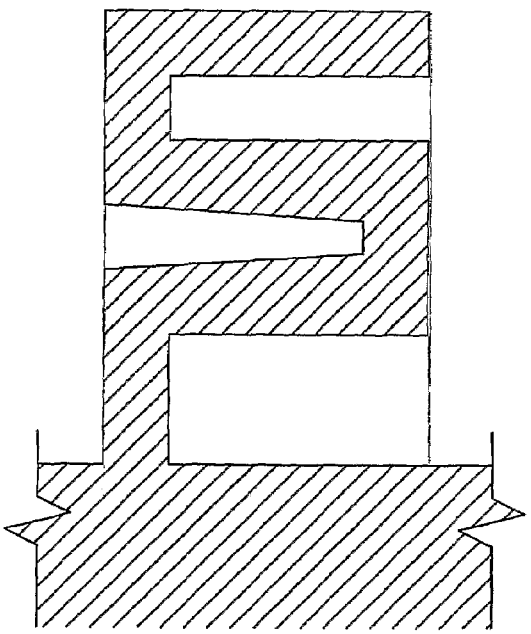
FIG. 12 shows a tenth modification of the support shown in FIG. 2.

FIG. 12 shows a modification in which two of the legs have decreasing thicknesses in the direction from the top part to the bottom parts.

Figure 13:
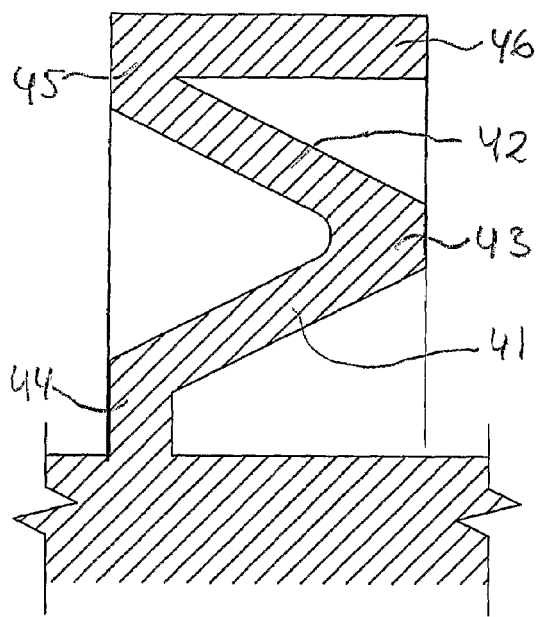
FIG. 13 shows a further embodiment of a support.

FIG. 13 shows an alternative embodiment of a horn support in which the first leg 41 and the second leg 42 extend convergently in the direction towards the top part 43. At its end opposite the top part 43 the first leg 42 passes into a bottom part 44 being connected with the outer face of the horn such that a groove is defined between the bottom part 44, the leg 41 and the outer face of the horn. At its end opposite the top part 43 the second leg 42 passes into a second bottom part 45 from which a third leg 46 extends. The second leg 42 and the third leg 46 thus define a groove.

Figure 14:
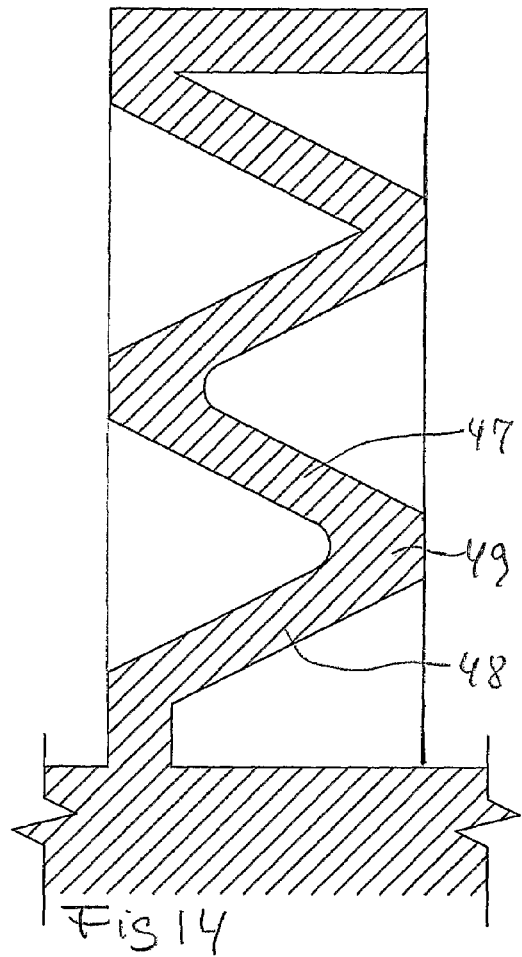
FIG. 14 shows a modification of the support shown in FIG. 13.

FIG. 14 shows a modification of the support shown in FIG. 13 comprising two additional legs 47, 48 converging in direction towards an additional top part 49.

Figure 15:
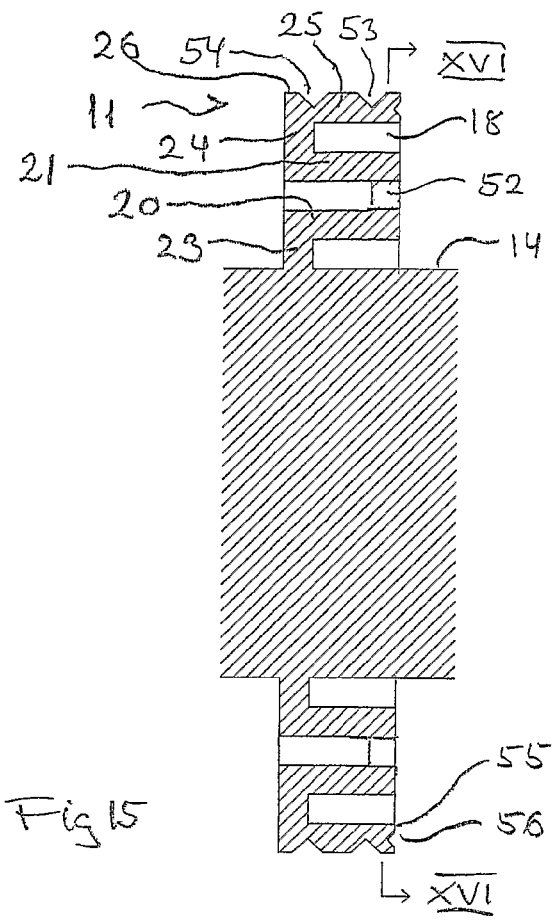
FIG. 15 is an axial sectional view through a further embodiment of a support.
Figure 16:
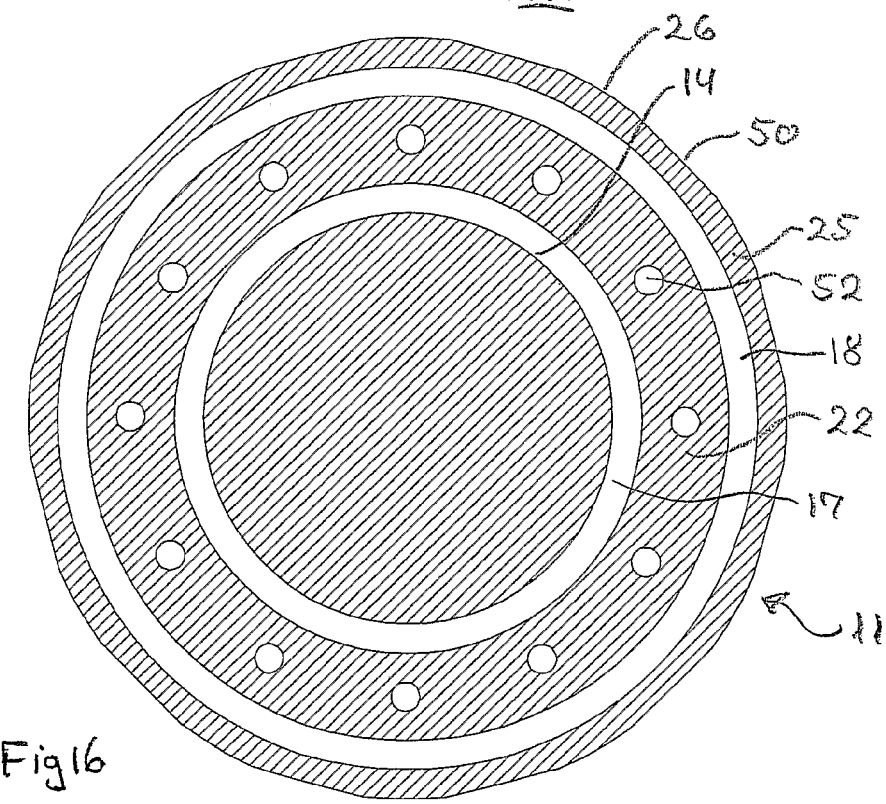
FIG. 16 is a radially sectional view along the line XVI-XVI of the support shown in FIG. 15.

Referring now to FIGS. 15 and 16 which show an axial and a radial section, respectively, through an alternative embodiment of a horn support. The horn support corresponds substantially to the horn support shown in FIG. 2, why only the differences therebetween are described in detail.

The radially outer face 26 of the horn support 11 is provided with a plurality of recesses 50. In the shown embodiment twelve recesses are provided with the same mutual spacing in circumferential direction. Abutment faces 51 defined between the recesses abut the inner face 10 (not shown in FIGS. 15 and 16) of the hollow shaft 1. Thus, twelve abutment faces 51 are also provided with the same mutual spacing in the circumferential direction. In the shown embodiment, the recesses 50 are plane and formed by machining of the cylindrical face 26 of the support. It should further be noted that the recesses 50 extend axially in the entire width of the support. It should also be noted that for purely illustrative reasons twelve recesses and abutment faces are shown. In practice, the number of recesses and abutment faces are often higher. As previously mentioned, in practice excellent results have been obtained with forty-five recesses and abutment faces.

The support shown in FIGS. 15 and 16 is also provided with a plurality of axially through-going holes 52 in the bottom part 22. The holes 52 are arranged with the same mutual spacing in circumferential direction. In a radial direction the holes 52 are aligned with the abutment faces 51. In the present example twelve holes 52 are also provided. As it appears from FIG. 15, the holes 52 each has a diameter corresponding substantially to the spacing between the first leg 20 and second leg 21 of the support.

Furthermore, in its outer face 26 the support 11 is provided with two circumferential mutually interspaced grooves 53, 54. The grooves 53, 54 and the recesses 50 serve to reduce the contact area between the support and the inner face of the hollow shaft such that less vibration energy in form of energy loss is transferred from the horn to the hollow shaft and thus to the housing of the rotary sealer. The holes 52 force the vibrations into the areas of the recesses 50 and thus away from the abutment faces 51. As a result, the amount of vibration energy transferred to the hollow shaft in form of loss is reduced.

Finally, in its free end face 55 the radially outer leg 25 is provided with an additional groove 56.

In the embodiments described above, the annular support is formed integrally with the horn. It should, however, be understood that the support may also be produced as a separate part which is secured to the horn, e.g. by shrinking, in particular if the horn is not to vibrate with high vibration amplitudes. In this case it is preferred to secure the support to the horn via a leg so as to obtain a large abutment face.

It should also be noted that the bottom parts, top parts and legs of the annular support are comparatively thin-walled and have a thickness of below 3 mm, preferably a thickness between 0.4 and 2 mm, more preferably between 0.5 and 1.5 mm and most preferably a wall thickness between 0.6 and 1.2 mm. The spacing between the legs are preferably also between about 0.4 and 2 mm, preferably between 0.5 and 1.5 mm and most preferably between about 0.6 and 1.2 mm. The axial length of the annular support is preferably also comparatively small, preferably less than 10 mm, more preferably less than 5 mm and most preferably between 1.5 and 4 mm.

Finally it should be noted that the support does not necessarily have to be connected to the outer face of the hollow shaft via a leg as in the shown examples, but the connection may also be provided via an upper or bottom part.

LIST OF REFERENCE NUMERALS

1 Hollow shaft
2 Longitudinal axis
3 Housing
4, 5 Bearings
6 Converter
7 Booster
8 Sealing horn
9 Booster support
10 Inner face
11 Horn support
12 Axial end of hollow shaft
13 Peripheral sealing area
14 Outer face of the horn
15 Anvil roller
16 Peripheral face
17 Groove
18 Groove
19 Upper end
20 First leg
21 Second leg
22 Top part
23 First bottom part
24 Second bottom part
25 Third leg
26 Radially outer face
27 Slotted area
28 Outer thread
29 Inner thread
30 Union
31 Conical face
32 Recess
33 Recess
34 Soft inner corner
35 Body of an elastomeric material
36, 37 Additional legs
38, 38 Additional top part
40 Increased wall thickness
41 First leg
42 Second leg
43 Top part
44 First bottom part
45 Second bottom part
46 Third leg
47, 48 Additional leg
49 Additional top part
50 Recesses
51 Abutment faces
52 Holes
53 Circumferential groove
54 Circumferential groove
55 End face
56 Additional groove

The invention claimed is:

1. A rotary ultrasonic sealer comprising a hollow shaft (1) having a longitudinal axis (2) and being rotatably arranged in a housing (3) for driven rotation about its longitudinal axis (2), said sealer further comprising a horn (8) arranged coaxially in the hollow shaft (1) and connected to a converter (6) and preferably also a booster (7), arranged coaxially in the hollow shaft, the horn (8) being provided with a peripheral sealing area (13) outside an axial end (12) of the hollow shaft (1) and the housing (3), and wherein the horn (8) is connected to the hollow shaft (1) by means of at least one annular, metallic support (11) extending between an outer face (14) of the horn (8) and an inner face (10) of the hollow shaft (1) and abutting the inner face (10) of the hollow shaft (1) with a radially outer face (26), said support (11) being arranged in a point with minimum vibration amplitude in the longitudinal direction of the horn, characterised in that the at least one annular support (11) is corrugated in cross section such that at least two grooves (17, 18) and one ridge (19) arranged between the two grooves are provided between the inner face (10) of the hollow shaft (1) and the outer face (14) of the horn (8), the annular support (11) comprising a first leg (20) and a second leg (21) being interconnected at first ends thereof via a top part (22) and being provided with a first bottom part (23) and a second bottom part (24), respectively, at second ends opposite the first ends.

2. A rotary sealer according to claim 1, characterised in that the annular support (11) is formed integrally with the horn (8), whereby the first leg (20), the first bottom part (23) and the outer face (14) of the horn define a groove (17).

3. A rotary sealer according to claim 1, characterised in that the annular support (11) is provided with a third leg (25) extending from the second bottom part (24) such that the third leg (25), the second bottom part (24) and the second leg (21) define a groove (18).

4. A rotary sealer according to claim 1, characterised in that the first and second legs (20, 21) of the support (11) are mutually parallel and the bottom parts (23, 24) are parallel to the top part (22).

5. A rotary sealer according to claim 1, characterised by sharp corners between at least on leg and the associated upper and/or bottom part.

6. A rotary sealer according to claim 1, characterised in that the at least one annular support (11) is arranged one quarter of a wavelength of the vibrations of the horn (8) from the peripheral sealing area (13) of the horn (8).

7. A rotary sealer according to claim 1, characterised in that the radially outer face (26) of the support (11) is provided with a plurality of mutually interspaced recesses (50), abutment faces (51) abutting the inner face (10) of the hollow shaft (1) being formed between the recesses (50).

8. A rotary sealer according to claim 7, characterised in that the recesses (50) include axially extending recesses extending in the entire width of the support (11) and preferably being arranged with the same mutual spacing in circumferential direction.

9. A rotary sealer according to claim 1, characterised in that in its top part (22) and/or in its first bottom part (23) and/or in its second bottom part (24 the support provided with a number of axially through-going holes (52) preferably arranged with the same mutual spacing in circumferential direction.

10. A rotary sealer according to claim 7, characterised in that the through-going holes (52) are arranged substantially radially aligned with the abutment faces (51).

11. A rotary sealer according to claim 9, characterised in that the through-going holes (52) are arranged substantially radially aligned with the abutment faces (51).

\* \* \* \* \*